United States Patent Office 3,161,872
Patented Dec. 15, 1964

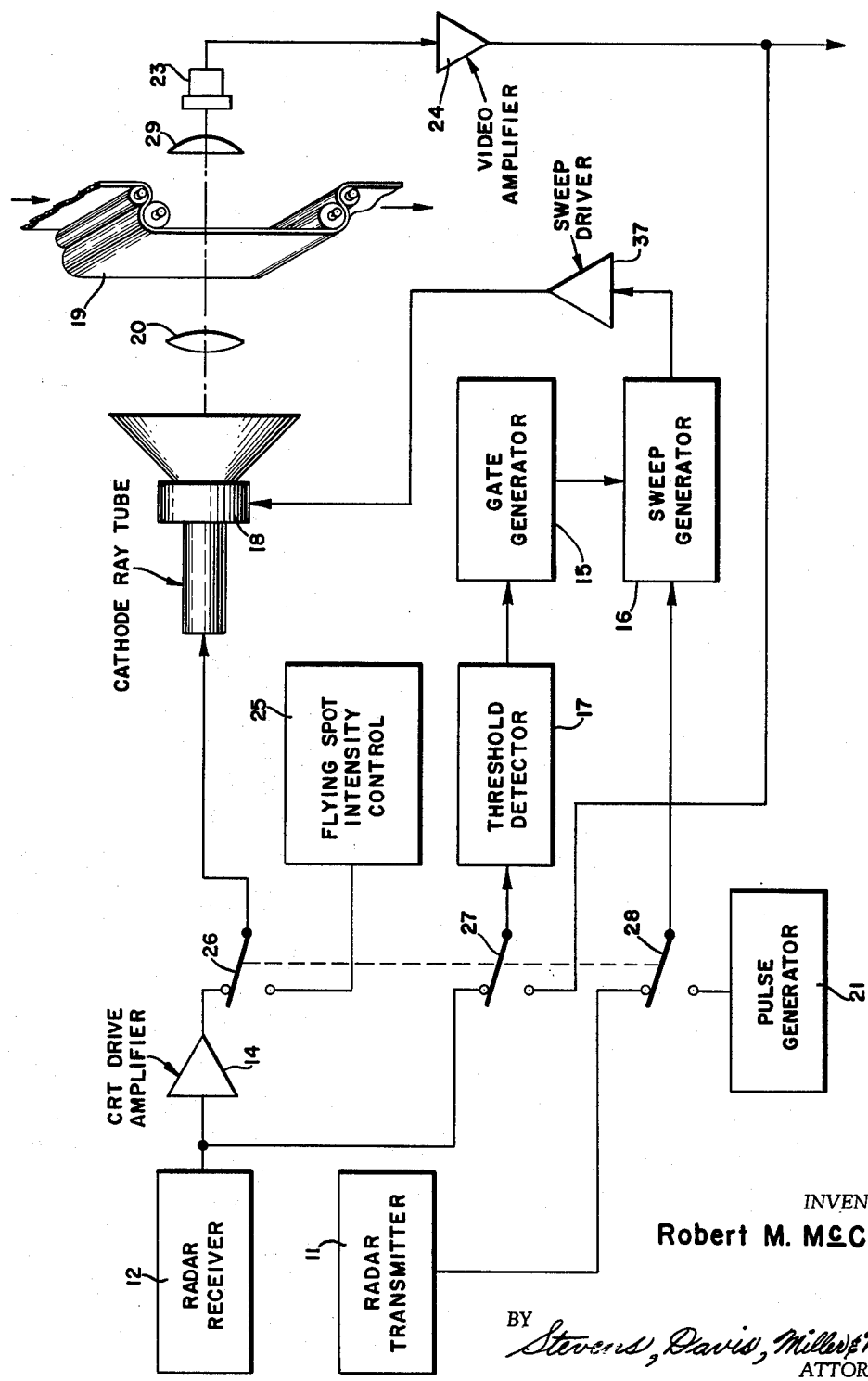

3,161,872
BEACON RADAR RECORDING AND
REPRODUCING
Robert M. McClure, Dallas, Tex., assignor to Texas Instruments Incorporated, Dallas, Tex., a corporation of Delaware
Filed Mar. 22, 1961, Ser. No. 97,674
20 Claims. (Cl. 343—6.5)

This invention relates to the recording of radar beacon signals and more particularly to an improved system for recording the beacon signals on a minimum amount of film.

In a radar beacon system an interrogation signal is periodically transmitted from a control center. The interrogation signals are directed in a narrow beam which is rotated horizontally. Aircraft of the system are equipped to detect the interrogation signals. When such an aircraft detects an interrogation signal as a result of coming within the beam, the aircraft will transmit a beacon response, which consists of a group of 16 pulses approximately 0.5 microsecond wide with a period of 1.45 microseconds. The beacon response is then detected at the control center. The azimuth of the aircraft can be determined by azimuth of the beam of interrogation signals, the range of the aircraft can be determined by the time interval between the instant the interrogation signal was transmitted and the instant the beacon response was recieved, and other information such as the identity of the aircraft can be determined by the codification of the pulses in the beacon response.

The detected beacon response could be recorded by a system such as described in the copending application Serial No. 97,678, entitled Continuous Recorder System for Radar Signals filed on March 22, 1961, invented by Robert M. McClure, and assigned to the assignee of the present invention. This system records radar signals by means of a cathode ray tube. The electron beam is swept across the face of the cathode ray tube in a single line scan which is synchronized with the transmitted radar pulses. The received radar signals modulate the intensity of the displayed trace on the face of the cathode ray tube so that a bright spot in the trace is displayed each time a radar signal is received. A strip of film is moved continuously across the face of the cathode ray tube, perpendicularly to the scan to photograph the display. In this manner, the radar signals are recorded. Azimuth is indicated along the length of the film strip and range is indicated across the width of the film.

If the above-described system were used to record the beacon radar signals, the scan would be synchronized with the interrogation signals and the pulses of the beacon response would modulate the intensity of the trace displayed on the face of the cathode ray tube. However, the pulses of the beacon response are much closer together than reflected radar signals and in order to resolve each individual pulse of a beacon response on the face of the cathode ray tube, the electron beam would have to be moved at a much faster rate across the face of the tube. This increase in speed in the scan of the electron beam means that the length of the single line scan would have to be proportionally increased. As a result, the width of the moving film strip used to photograph the display would have to be much greater and thus a large amount of film would be required to record the beacon radar signals.

By means of the present invention, the width of the film necessary to record the beacon responses at the desired increased resolution, is reduced to less than that required to record reflected radar signals as described in the aforesaid copending application. The system of the present invention accomplishes this film width reduction by sweeping the electron beam of the cathode ray tube across the face of the tube selectively at two different rates. The beam is normally swept across the face of the tube at a slow rate. If a beacon response were used to intensity modulate the trace when the beam is being swept at this slow rate, pulses of the beacon response could not be resolved in the trace on the face of the cathode ray tube. The pulse group of a beacon response always starts with a framing pulse. When the framing pulse leading a pulse group of a beacon response is received, the speed at which the electron beam is being swept is automatically increased to a rate fast enough to enable the display of the pulses of the pulse group to be resolved on the face of the cathode ray tube. At the conclusion of the pulse group the sweep of the electron beam reverts to the slow rate at which it was being swept prior to the reception of the beacon response. In this manner the length of the single line scan necessary to record the beacon signals is made much shorter and consequently a much narrower film width can be used to record the beacon signals.

Further objects and advantages of the invention will become readily apparent as the following detailed description of the invention unfolds and when taken in conjunction with the single figure of the drawing, which shows a block diagram of the invention.

As shown in the drawing, the block representing a radar transmitter is designated by the reference number 11. This transmitter 11 sends out the beacon interrogation signals in a narrow beam. The direction of the beam is continuously rotated so as to scan the horizon. When an aircraft which is equipped to respond to the beacon interrogation signal comes within the beam of the interrogation signal, the aircraft will transmit a beacon response. The beacon response transmitted by the aircraft consists of 16 high frequency pulses of 0.5 microsecond in length with a period of 1.45 microseconds, making the total length of the beacon response approximately 25 microseconds. The beacon response transmitted by the aircraft begins and ends with a framing pulse. When an aircraft transmits a beacon response it will be detected by receiver 12, which demodulates the pulses of the beacon response. The demodulated output of the receiver is referred to as video and is used to modulate the intensity of the trace displayed on the face of a cathode ray tube 18.

A sawtooth waveform is applied to the horizontal deflection input of the cathode ray tube 18 by sweep driver 37. There is no vertical deflection used in the system so the electron beam sweeps across the face of the tube in a single horizontal line as controlled by the sawtooth waveform from sweep generator 16. The sweep generator is synchronized with the transmitter 11. Each time the transmitter 11 sends out an interrogation signal it applies a trigger signal to the sweep generator 16. This trigger signal causes the generator 16 to start a new cycle so that each sawtooth waveform is started simultaneously with the transmission of an interrogation signal.

The video output of the receiver 12 is amplified by amplifier 14 and applied to the intensity control grid of the cathode ray tube 18. The voltage applied to this control grid controls the intensity of the trace on the face of the cathode ray tube. A bias is applied to this control grid so that no trace is normally visible. When a pulse occurs in the amplified video output of the amplifier 14, it causes the trace to become momentarily visible. Thus a spot will appear on the face of the cathode ray tube in response to the pulse in the video output of amplifier 14. This visible spot 15 on the single line being scanned by the electron beam and its horizontal position depends upon when said spot occurs in relation to the start of the sawtooth then being generated by the sweep generator 16.

The video output from the receiver 12 is also applied to threshold detector 17. When a framing pulse occurs in the video output of the receiver 12, the detector 17 in response thereto triggers gate generator 15. When the gate generator 15 is triggered it applies a speed-up signal to the sweep generator 16 for a period of 24 microseconds. In response to receiving the speed-up signal from the gate generator 15, the sweep generator 16 increases the slope of the sawtooth then being generated. The sweep generator 16 continues to generate the sawtooth at the increased slope for as long as it receives the speed-up signal from the gate generator 15. Thus the slope of the sawtooth is increased for an interval of 24 microseconds. After this 24 microsecond period, the slope of the sawtooth returns to its original value. Thus when a beacon response is received the slope of the sawtooth is increased during the period that the beacon response is being received. Each pulse of the beacon response causes the intensity of the trace on the face of the cathode ray tube to increase. Thus each pulse causes a visible spot to be produced on the face of the cathode ray tube. The visible spots representing the pulses of the beacon response are displaced horizontally from each other because the electron beam describing the trace is being swept horizontally while the pulses of the beacon response are being received. The 24 microsecond interval during which the slope of the sawtooth generated by the sweep generator 16 is increased is of course substantially less than the period of one cycle or sawtooth of the sawtooth waveform.

If the electron beam were swept at its normal rate the spots representing the pulses of the beacon response would appear so close together that they could not be resolved or distinguished from each other. However, as explained above, when a beacon response is being received, the slope of the sawtooth is automatically increased. This increase in slope causes the rate at which the electron beam is being swept to increase accordingly. In this manner the visible spots representing the individual pulses of a beacon response are spread out so that they can be resolved.

The trace displayed on the face of the cathode ray tube 18 is focused on a strip of film 19 by means of a lens 20. The lens 20 is designed so that the length of the trace focused on the film 19 will be reduced from its length on the face of the cathode ray tube by a ratio of 11.1 to 1. The strip of film 19 is continuously moved in a vertical direction, which is perpendicular to the direction of the trace. As a result, the film 19 continuously photographs the trace displayed on the face of the cathode ray tube 18. The speed of movement of the film 19 is selected so that by the time the beam transmitted by the radar transmitter 11 has moved through its resolution angle or beam width, the film 19 will have moved sufficiently far to be exposing a new line on the film. In this manner the beacon radar response is continuously recorded. The film 19 is then developed to provide a permanent record of the information.

To play the information back the developed film is moved past the face of the cathode ray tube 18 in the same manner as when it was recorded. The cathode ray tube 18 is operated as a flying spot scanner. In order to operate the cathode ray tube 18 in this manner, the output from the amplifier 14 is disconnected from the control grid of the cathode ray tube 18 and a bias applied to the control grid from the flying spot intensity control circuit 25. A switch 26 is used to make this change in connection to the cathode ray tube 18. In this manner there is provided a constant intensity spot, which is scanned in the same single horizontal line across the face of the cathode ray tube.

The output of the receiver 12 is disconnected from the threshold detector 17 by a switch 27. The sweep generator 16, instead of being triggered by the transmitter 11 to start each new sawtooth, is triggered by a pulse generator 21. This change is effected by means of a switch 28. The pulse generator 21 causes the sweep generator 16 to produce the sawtooth waveform at the same frequency at which it was produced during the recording operation. The sawtooth waveform causes the electron beam of the cathode ray tube to sweep horizontally across the face of the cathode ray tube. As a result, a moving or flying spot of light is produced on the face of the cathode ray tube.

The flying spot of light is focused on the moving strip of developed film 19 and thus a spot of light will be scanned horizontally across the moving strip of film. The film is opaque to this moving spot of light except where a spot indicative of a received pulse has been photographed. When the light impinges on a photographed spot indicative of a pulse of a beacon response, the light passes through the film and is focused by lens 29 on a photocell 23. The photocell 23 detects the light and generates an electric pulse. Thus the photocell 23 generates pulses, each of which is indicative of a pulse in a recorded beacon response. The pulses are generated sequentially in the same order in which they were originally transmitted since the light spot scans over the recorded pulses in the same sequence in which they were recorded. Therefore, the first pulse of a group of pulses representing a recorded beacon response generated by the photocell 23 represents a framing pulse.

The output from the photocell 23 is amplified by a video amplifier 24 and applied to the threshold detector 17. The switch 27 connects the output of video amplifier 24 to the threshold detector 17 during the playback operation. When a framing pulse is reproduced by the photocell 23, it is detected by the threshold detector 17 which in response thereto triggers the gate generator 15. Accordingly, the gate generator 15 applies a 24 microsecond speed-up signal to the sweep generator 16 which increases the slope of the sawtooth then being generated for a 24 microsecond interval. Therefore, the speed at which the spot of light is swept across the film is increased for an interval of 24 microseconds and therefore the spot of light moves across the entire recorded beacon response at the increased speed. The pulses generated by the photocell 23 are therefore at the same repetition rate as they were in the original beacon response prior to recording. Thus the output of the video amplifier 24 is substantially identical to the output of the receiver 12 during the recording operation.

The switches 26, 27, and 28 are ganged together. When they are in the position shown in the drawing the system is connected for a recording operation. When the switches are moved to their other position the system is connected for a playback operation.

The equipment and components comprising this invention but not described in specific detail are conventional and may be identified and obtained by persons skilled in this art. For example, gate generator 15 is shown in FIGURE 6–10 and described in detail on pages 187–190 of the text book entitled "Pulse and Digital Circuits," by Millman and Taub (McGraw Hill-1956); and the threshold detector 17 is shown in FIGURE 14–2 and described in detail on pages 430–432 of this same publication. Also, the sweep generator 16 is the same or similar to a sweep generator as described in Millman and Taub "Pulse and Digital Circuits" on pages 234 and 235 and shown in FIGURE 7–34 when modified in a conventional manner by the addition of a gating input to the pentode grid to provide two charging rates for the Taub condenser C. This is accomplished by joining two diodes between two voltage levels and providing a stepped control voltage to the pentode grid which is attached to the junction of the two diodes. Another conventional two-speed sweep that is well known to persons of average skill in this art is comprised of a triode in series with two paralleled pentodes.

In this combination, the junction between the triode and the two pentodes has a capacitor attached thereto for generating sweeps of different speeds as determined by the changing of the time constant of the capacitor circuit in accordance with voltages controlling the operation of the pentodes.

The above description is of a preferred embodiment of the invention and many modifications may be made thereto without departing from the spirit and scope of the invention, which is limited only as defined in the appended claims.

What is claimed is:

1. In combination with a radar beacon system comprising a radar beacon transmitter to transmit interrogation signals and a radar receiver to detect beacon responses, said beacon responses each beginning with a framing pulse; a radar beacon recording system comprising a cathode ray tube, means to cause the electron beam to sweep across the face of said cathode ray tube in a single fixed straight line in synchronization with said interrogation signals, means to intensity modulate the trace displayed on the face of said cathode ray tube with the pulses of the beacon responses detected by said radar receiver, means operative in response to the framing pulse leading each of said beacon responses detected by said radar receiver to increase the rate at which said electron beam is being swept across the face of said cathode ray tube for a time interval approximately equal to the length of a beacon response, a strip of film positioned to photograph the display on the face of said cathode ray tube, and means to move said strip of film continuously across the face of said cathode ray tube perpendicularly to the direction of said fixed straight line to continuously photograph the trace displayed on the face of said cathode ray tube.

2. A system for reproducing radar beacon signals continuously recorded on a strip of film, said film having beacon responses expanded thereon, comprising a cathode ray tube, means to sweep the electron beam across the face of the tube in a single line to produce a visible flying spot of constant intensity, means to move said strip of film across the face of said cathode ray tube perpendicularly to the direction of said fixed straight line, a photocell positioned to detect the light passing through said film and to convert the light into electrical signals to thereby reproduce recorded beacon responses, and means operative in response to a framing pulse leading a beacon response being reproduced by said photocell to increase the rate at which said electron beam is swept across the face of said cathode ray tube for a time interval approximately equal to the duration of a beacon response.

3. In combination with a radar receiver to detect beacon responses, said beacon responses each beginning with a framing pulse; a radar beacon recording system comprising a cathode ray tube, means to cause the electron beam to sweep across the face of said cathode ray tube, means to intensity modulate the trace displayed on the face of said cathode ray tube with the pulses of the beacon responses detected by said radar receiver, means operative in response to the framing pulse leading each of said beacon responses detected by said radar receiver to increase the rate at which said electron beam is swept across the face of said cathode ray tube, and means to continuously photograph the display on the face of said cathode ray tube.

4. A radar beacon system comprising a radar beacon transmitter to transmit interrogation signals and a radar receiver to detect beacon responses, said beacon responses each beginning with a framing pulse, a cathode ray tube, means to cause the electron beam to sweep across the face of said cathode ray tube in synchronism with said interrogation signals, means to intensity modulate the trace displayed on the face of said cathode ray tube with the pulses of the beacon responses detected by said receiver, and means operative in response to the framing pulse leading each of said beacon responses to increase the rate at which said electron beam is being swept across the face of said cathode ray tube.

5. In combination with a radar beacon system comprising a radar beacon transmitter to transmit interrogation signals and a radar receiver to detect beacon responses, said beacon responses each beginning with a framing pulse; a radar beacon display system comprising a cathode ray tube, means to cause the electron beam to sweep across the face of said cathode ray tube in a single line in synchronization with said interrogation signals, means to intensity modulate the trace displayed on the face of said cathode ray tube with the pulses of the beacon responses detected by said radar receiver, and means operative in response to the framing pulse leading each of said beacon responses detected by said radar receiver to increase the rate at which said electron beam is being swept across the face of said cathode ray tube for a time interval approximately equal to the length of a beacon response.

6. In combination with a radar receiver to detect beacon responses, said beacon responses each beginning with a framing pulse; a radar beacon display system comprising a cathode ray tube, means to cause the electron beam to sweep across the face of said cathode ray tube, means to intensity modulate the trace displayed on the face of said cathode ray tube with the pulses of the beacon responses detected by said radar receiver, and means operative in response to the framing pulse leading each of said beacon responses detected by said radar receiver to increase the rate at which said electron beam is swept across the face of said cathode ray tube.

7. A system for displaying received radar signals comprising means for transmitting and receiving radar signals, display means, means for sweeping a trace across the face of said display means in synchronism with the transmitted signals, means for modulating said trace with received radar signals, and means responsive to the received radar signal for changing the sweep rate of said trace across the face of said display means.

8. The system of claim 7 wherein said means responsive to the received radar signal for changing the sweep rate of said trace across the face of said display means increases said sweep rate.

9. The system of claim 7 wherein said means responsive to the received radar signal for changing the sweep rate of said trace across the face of said display means changes said sweep rate for a predetermined time interval.

10. In combination with a radar receiver to detect received radar signals, a received radar signal display system comprising a display means, means for sweeping a trace across the face of said display means, means for modulating said trace displayed on the face of said display means with the received radar signals detected by said radar receiver, and means responsive to the received radar signal for changing the sweep rate of said trace across the face of said display means.

11. The system of claim 10 wherein said means responsive to the received radar signal for changing the sweep rate of said trace across the face of said display means changes said sweep rate for a predetermined time interval.

12. A system for reproducing received radar signals recorded on a light modulation media with the received radar signals expanded thereon, comprising means for sweeping a light source across the surface of said light modulation media, and means positioned to detect the light passing through said media and responsive to light modulation representing a recorded received radar signal for changing the sweep rate of said light source.

13. The system of claim 12 wherein said means positioned to detect the light passing through said media and responsive to light modulation representing a recorded received radar signal for changing the sweep rate of said light source changes said sweep rate for a predetermined time interval.

14. A system for recording and reproducing radar beacon responses comprising means for receiving beacon responses, display means, means for sweeping a trace across the face of said display means, means for modulating said trace with beacon responses received by said receiving means, means responsive to the received beacon responses for changing the sweep rate of said trace across the face of said display means, means for recording the display on a light modulation media; and means for reproducing the received beacon responses recorded on said light modulation media comprising means for sweeping a light source across the surface of said media, and means positioned to detect the light passing through said media and responsive to light modulation representing a recorded received beacon response for changing the sweep rate of said light source.

15. A system for recording and reproducing received radar signals comprising means for receiving radar signals, display means, means for sweeping a trace across the face of said display means, means for modulating said trace with the received radar signals from said receiving means, means responsive to the received radar signals for changing the sweep rate of said trace across the face of said display means, means for recording the display on a light modulation media; and means for reproducing the received radar signals recorded on said light modulation media comprising means for sweeping a light source across the surface of said media, and means positioned to detect the light passing through said media and responsive to light modulation representing a recorded received radar signal for changing the sweep rate of said light source.

16. A system for recording and reproducing received radar signals comprising means for transmitting and receiving radar signals, display means, means for sweeping a trace across the face of said display means in synchronism with the transmitted signals, means for modulating said trace with received radar signals, means responsive to the received radar signal for changing the sweep rate of said trace across the face of said display means for a predetermined time interval, means for recording the display on a light modulation media; means for reproducing the received radar signals recorded on said light modulation media comprising means for sweeping a light source across the surface of said media, and means positioned to detect the light passing through said media and responsive to light modulation representing a recorded received radar signal for changing the sweep rate of said light source for said predetermined time interval.

17. A display system comprising a source of signals having a predetermined repetition rate, means for detecting signals to be displayed, said signals to be displayed having an unknown time of occurrence with respect to said signals having a predetermined repetition rate, display means, means for sweeping a trace across the face of said display means in synchronism with said signals having a predetermined repetition rate, means for modulating said trace with said signals to be displayed, and means responsive to said signals to be displayed for changing the sweep rate of said trace across the face of said display means.

18. A display system comprising a source of signals having a predetermined repetition rate, signal translating means for supplying a signal to be displayed, said signal to be displayed having an unknown time of occurrence with respect to said signals having a predetermined repetition rate, display means, means for sweeping a trace across the face of said display means in synchronism with said signals having a predetermined repetition rate, means for modulating said trace with said signals to be displayed, and means responsive to said signals to be displayed for changing the sweep rate of said trace across the face of said display means.

19. A recording system comprising a source of signals having a predetermined repetition rate, means for detecting signals to be recorded, said signals to be recorded having an unknown time of occurrence with respect to said signals having a predetermined repetition rate, recording means, means for sweeping a modulating beam across the surface of said recording means in synchronism with said signals having a predetermined repetition rate, means for modulating said modulating beam with said signals to be recorded, and means responsive to said signals to be recorded for changing the sweep rate of said modulating beam across the surface of said recording means.

20. A system for recording and reproducing radar beacon responses comprising a radar beacon transmitter for transmitting interrogation signals and a radar receiver for detecting beacon responses, said beacon responses each beginning with a framing pulse, a cathode ray tube, means for causing the electron beam to sweep across the face of said cathode ray tube in a single line, means for synchronizing said sweep means with said interrogation signals, means for intensity modulating the trace displayed on the face of said cathode ray tube with the pulses of the beacon responses detected by said radar receiver, means responsive to the framing pulse leading each beacon response detected by said radar receiver for increasing the rate at which said electron beam is being swept across the face of said cathode ray tube for a time interval approximately equal to the length of said beacon response, and means for recording the display on a strip of film, including means for moving said strip of film continuously past the face of said cathode ray tube perpendicularly to said single line; means for reproducing the beacon responses recorded on said film comprising means for synchronizing said sweep means with a signal having a predetermined repetition rate, means for maintaining the trace on the face of said cathode ray tube at a constant visible intensity, a photocell positioned for detecting light passing through said film and for converting the detected light into electrical signals thereby reproducing the recorded beacon responses, and means responsive to the framing pulse leading each beacon response reproduced by said photocell for increasing the rate at which said electron beam is being swept across the face of said cathode ray tube for said time interval approximately equal to the length of a beacon response.

References Cited in the file of this patent

UNITED STATES PATENTS

| | | |
|---|---|---|
| 2,300,189 | Wolff | Oct. 27, 1942 |
| 2,407,898 | Norgaard | Sept. 17, 1946 |
| 2,416,320 | Jeanne | Feb. 25, 1947 |
| 2,453,711 | Isbister et al. | Nov. 16, 1948 |
| 2,508,562 | Bonner | May 23, 1950 |
| 2,680,210 | Miller et al. | June 1, 1954 |